US012607881B2

(12) United States Patent
Meyer et al.

(10) Patent No.: US 12,607,881 B2
(45) Date of Patent: Apr. 21, 2026

(54) METHOD AND PROCESSING UNIT FOR GENERATING AT LEAST ONE ACTIVATION SIGNAL FOR A WARNING DISPLAY OF A USER OF SMART GLASSES

(71) Applicant: Robert Bosch GmbH, Stuttgart (DE)

(72) Inventors: Johannes Meyer, Haseluenne (DE); Thomas Alexander Schlebusch, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 364 days.

(21) Appl. No.: 18/345,231

(22) Filed: Jun. 30, 2023

(65) Prior Publication Data

US 2024/0061276 A1     Feb. 22, 2024

(30) Foreign Application Priority Data

Aug. 19, 2022     (DE) ..................... 10 2022 208 622.8

(51) Int. Cl.
*G02C 11/00* (2006.01)
*G01S 7/51* (2006.01)
(Continued)

(52) U.S. Cl.
CPC ................ *G02C 11/10* (2013.01); *G01S 7/51* (2013.01); *G01S 13/62* (2013.01); *G01S 17/58* (2013.01); *G02B 27/0093* (2013.01)

(58) Field of Classification Search
CPC . G01S 13/93; G01S 17/93; G01S 7/51; G01S 13/62; G01S 17/58; G01S 13/588;
(Continued)

(56) References Cited

U.S. PATENT DOCUMENTS 8,547,298 B2 * 10/2013 Szczerba ............... G01S 13/867
340/436
8,629,903 B2 * 1/2014 Seder ..................... G02B 27/01
348/113
(Continued)

FOREIGN PATENT DOCUMENTS

CN        111949131 A  * 11/2020 ............. G06N 3/045
DE   102021109975 A1    10/2021
(Continued)

OTHER PUBLICATIONS

English translation of CN111949131 (Yeas : Nov. 17, 2020).*

*Primary Examiner* — Thomas K Pham
*Assistant Examiner* — Kuei-Jen L Edenfield
(74) *Attorney, Agent, or Firm* — NORTON ROSE FULBRIGHT US LLP

(57)     ABSTRACT

A method for generating an activation signal for a warning display of a user of smart glasses. First surroundings sensor signals from the rear and/or lateral surroundings of the user of the smart glasses are received using a processing unit. At least one object in the rear and/or lateral surroundings of the user of the smart glasses is detected as a function of the received first surroundings sensor signals. Second surroundings sensor signals are received as a function of the detected object. First and second motion signals of the user are received. A first movement trajectory of the detected object and a second movement trajectory of the smart glasses user are ascertained. A likelihood of a collision of the user of the smart glasses with the detected object is ascertained as a function of the ascertained first and second movement trajectories.

15 Claims, 4 Drawing Sheets

(51) Int. Cl.
  G01S 13/62      (2006.01)
  G01S 17/58      (2006.01)
  G02B 27/00      (2006.01)
(58) Field of Classification Search
  CPC ...... G01S 17/42; G01S 13/862; G01S 13/865;
        G01S 2013/9323; G01S 2013/9324; G01S
        13/58; G01S 13/86; G01S 13/931; G02C
        11/10; G02B 27/0093; G02B 27/017;
        G02B 2027/0138; G02B 2027/014; G02B
        27/00; G02B 27/01
  USPC .............................. 351/158; 359/13; 701/301
  See application file for complete search history.

(56)                References Cited

U.S. PATENT DOCUMENTS

| 9,285,589 B2 * | 3/2016 | Osterhout ............ G02B 27/017 |
| 11,353,708 B1 * | 6/2022 | Cherukuri .......... G02B 27/0093 |
| 2007/0057781 A1 * | 3/2007 | Breed ................... B60K 35/22 |
| | | 340/457.1 |
| 2012/0025964 A1 | 2/2012 | Beggs et al. |
| 2016/0093207 A1 | 3/2016 | Di Censo et al. |
| 2020/0192089 A1 * | 6/2020 | Haddick ................ G06F 3/005 |

FOREIGN PATENT DOCUMENTS

| EP | 2846172 A1 | 3/2015 |
| JP | 2013008307 A | 1/2013 |

* cited by examiner

METHOD AND PROCESSING UNIT FOR GENERATING AT LEAST ONE ACTIVATION SIGNAL FOR A WARNING DISPLAY OF A USER OF SMART GLASSES

CROSS REFERENCE

The present application claims the benefit under 35 U.S.C. § 119 of German Patent Application No. DE 10 2022 208 622.8 filed on Aug. 19, 2022, which is expressly incorporated herein by reference in its entirety.

FIELD

The present invention relates to a method for generating at least one activation signal for a warning display of a user of smart glasses. Moreover, the present invention relates to a processing unit that is designed to carry out the method, and smart glasses that include the processing unit.

BACKGROUND INFORMATION

Rear or lateral surroundings sensing of a vehicle are described in German Patent Application No. DE 10 2021 109 975 A1.

An object of the present invention is to also allow such rear and/or lateral surroundings sensing for the user of smart glasses.

SUMMARY

To achieve the object, a method for generating at least one activation signal for a warning display of a user of smart glasses is provided according to present invention. Moreover, a processing unit and smart glasses are also provided. According to an example embodiment of the present invention, in the method for generating at least one activation signal for a warning display of a user of smart glasses, first surroundings sensor signals from the rear and/or lateral surroundings of the user of the smart glasses are initially received. "The rear and/or lateral surroundings of the user" is intended to mean the surroundings to the rear and/or to the side relative to the user when the user is looking straight ahead. The first surroundings sensor signals are detected at a first point in time with the aid of at least one surroundings sensor situated at at least one temple of the smart glasses. In addition, at least one object in the rear and/or lateral surroundings of the user of the smart glasses is detected as a function of the received first surroundings sensor signals, with the aid of the processing unit. The object is intended in particular to mean an object that is moving relative to the user of the smart glasses. This may be a person and/or an animal and/or a vehicle, for example. In a further method step, second surroundings sensor signals from the rear and/or lateral surroundings of the user of the smart glasses are received as a function of the detected object, with the aid of the processing unit. These second surroundings sensor signals are detected at a second point in time following the first point in time with the aid of the at least one surroundings sensor. In addition, first and second motion signals of the user of the smart glasses are received with the aid of the processing unit. These motion signals of the user are detected at two different points in time, in particular at the first point in time and at the second point in time. For example, a motion sensor that is likewise integrated into the smart glasses may be used for this purpose. A first movement trajectory of the detected object is subsequently ascertained as a function of the received first and second surroundings sensor signals, with the aid of the processing unit. The first movement trajectory is the future motion path of the detected object. In addition, a second movement trajectory of the user of the smart glasses is ascertained as a function of the received first and second motion signals of the user of the smart glasses, with the aid of the processing unit. Here as well, the second movement trajectory is the future motion path of the user of the smart glasses. A likelihood of an in particular future collision of the user of the smart glasses with the detected object is subsequently ascertained as a function of the ascertained first and second movement trajectories, with the aid of the processing unit. The risk of a collision is thus ascertained as a function of the two movement trajectories. In a further method step, the at least one activation signal for the warning display of the user of the smart glasses is generated as a function of the ascertained possible collision, with the aid of the processing unit. The method thus allows the smart glasses and the sensors integrated there to be utilized in order to warn the user of a possible collision with an object outside his/her visual field. The object may also be situated in a blind spot of the user, for example, if the user is presently using a vehicle, in particular a bicycle, with rearview mirrors.

According to an example embodiment of the present invention, the first and second surroundings sensor signals preferably represent distance signals. The distance signals in particular provide information about the distance from the user relative to the detected object. Alternatively or additionally, the surroundings sensor signals are speed signals of the detected object.

According to an example embodiment of the present invention, the first and second motion signals of the user of the smart glasses preferably represent speed signals of the user. Alternatively or additionally, the motion signals are acceleration signals of the user of the smart glasses.

In addition, according to an example embodiment of the present invention, activity data of the user are preferably received with the aid of the processing unit. These activity data are detected at a third point in time. In particular, an eye tracker and/or an acceleration sensor of the smart glasses are/is used for this purpose. A user activity of the user is subsequently classified as a function of the received activity data, with the aid of the processing unit. Thus, prior to the object detection and the ascertainment of the likelihood of a collision, it is initially checked which activity the user is pursuing at that moment. The activity may be walking, running, or also bicycle riding, for example. In a further method step, at least one surroundings sensor of a plurality of surroundings sensors, situated at the smart glasses for detecting the first and second surroundings sensor signals, is activated or deactivated with the aid of the processing unit. For example, if walking or running is classified as the present user activity, a surroundings sensor with a high range, in particular a LIDAR sensor, is not needed. However, if an activity such as bicycle riding, in which the surroundings change quickly due to the higher speed, is determined as the present user activity, such a surroundings sensor with a high range is needed. In this case, surroundings sensors with a lower range may be deactivated. Power may thus be saved.

According to an example embodiment of the present invention, a speed of the user relative to the surroundings of the user is preferably ascertained as a function of the received first and second motion signals of the user of the smart glasses, with the aid of the processing unit. An in particular temporal spacing of the points in time for detecting the surroundings sensor signals from the rear and/or lateral surroundings of the user of the smart glasses, detected with the aid of the surroundings sensors, is subsequently adapted as a function of the ascertained speed of the user, with the aid of the processing unit. For example, if the user is presently moving on a bicycle and thus at a relatively high speed, the surroundings of the user also change relatively quickly. A higher sampling rate and thus shorter detection time periods are correspondingly needed. However, if the user of the smart glasses is presently walking, the surroundings of the smart glasses user also change only slowly. A lower sampling rate and thus longer detection time periods is/are correspondingly needed. Overall, this mode is also used for power savings.

According to an example embodiment of the present invention, the in particular temporal spacing of the points in time for detecting the surroundings sensor signals from the rear and/or lateral surroundings of the user of the smart glasses, detected with the aid of the surroundings sensors, is preferably increased, using the processing unit, if the ascertained likelihood of the collision of the user of the smart glasses with the detected object falls below a certain threshold value. Thus, for example, if it is determined that the object in the future will be remote from the user of the smart glasses, the sampling rate may be reduced, and thus the detection time periods may be lengthened. Here as well, power may be saved.

According to an example embodiment of the present invention, the activation signal for the warning display of the user of the smart glasses is preferably generated if the first and second movement trajectories meet, in particular at the same time. This may mean an intersection of the two movement trajectories, or also only touching of the movement trajectories. In both cases, the likelihood of a collision is increased.

According to an example embodiment of the present invention, the warning display is preferably overlaid on the user's visual field. "Overlay" is intended to mean in particular a virtual display. Alternatively or additionally, however, at least one LED may also be activated in the visual field of the user.

A further subject matter of the present invention is a processing unit that is designed to carry out the method described above. In this regard, according to an example embodiment of the present invention, the processing unit is designed to receive first surroundings sensor signals from the rear and/or lateral surroundings of the user of the smart glasses, detected at a first point in time with the aid of at least one surroundings sensor situated at at least one temple of the smart glasses. In addition, the processing unit is used to detect at least one object in the rear and/or lateral surroundings of the user of the smart glasses as a function of the received first surroundings sensor signals. Furthermore, the processing unit is designed to receive second surroundings sensor signals from the rear and/or lateral surroundings of the user of the smart glasses, detected at a second point in time following the first point in time with the aid of the at least one surroundings sensor, as a function of the detected object. Moreover, the processing unit is used to receive first and second motion signals of the user of the smart glasses detected at two different points in time, in particular at the first point in time and at the second point in time. In addition, the processing unit is used to ascertain a first movement trajectory of the detected object as a function of the received first and second surroundings sensor signals. Furthermore, the processing unit is designed to ascertain a second movement trajectory of the user of the smart glasses as a function of the received first and second motion signals of the user of the smart glasses. Moreover, the processing unit is used to ascertain a likelihood of an in particular future collision of the user of the smart glasses with the detected object as a function of the ascertained first and second movement trajectories, and to generate at least one activation signal for a warning display of the user of the smart glasses as a function of the ascertained possible collision.

A further subject matter of the present invention is smart glasses that include at least the above-described processing unit and a surroundings sensor situated at at least one temple of the smart glasses. According to an example embodiment of the present invention, the surroundings sensor is designed to detect first and second surroundings sensor signals from the rear and/or lateral surroundings of the user of the smart glasses. In addition, the smart glasses include a warning display, in particular a warning display device.

The smart glasses preferably additionally include a motion sensor situated at the smart glasses. The motion sensor is designed to detect first and second motion signals of the user of the smart glasses. The motion sensor is preferably a speed sensor and/or motion sensor.

The at least one surroundings sensor is preferably a radar sensor and/or an ultrasonic sensor and/or a LIDAR sensor.

According to an example embodiment of the present invention, the surroundings sensor for detecting the rear and/or lateral surroundings of the user of the smart glasses is preferably laterally situated on the outside of the at least one temple of the smart glasses. The surroundings sensor is thus better protected from being covered by hair of the user of the smart glasses. Alternatively or additionally, the at least one surroundings sensor is situated facing the rear at a curvature of the temple. This temple curvature is used in particular to fasten the smart glasses to an ear of the smart glasses user. In this position, the surroundings sensor is also less strongly affected by detection limitations due to hair or clothing of the user of the smart glasses.

The smart glasses preferably additionally include at least one acceleration sensor and/or eye tracking sensor for detecting activity data of the user.

The warning display, in particular the warning display device, is preferably designed as a retinal scan display of the smart glasses. In this regard, according to an example embodiment of the present invention, the smart glasses in particular include a projection unit that projects the warning display onto a holographic optical element situated on an eyeglass lens of the smart glasses, and that in turn diverts the warning display into the retina of the user. As an alternative to this virtual display, the warning display, in particular the warning display device, is designed as a light unit, in particular as an LED, the light unit being situated on an eyeglass lens, in particular a corner of the eyeglass lens.

DETAILED DESCRIPTION OF EXAMPLE EMBODIMENTS

Figure 1:
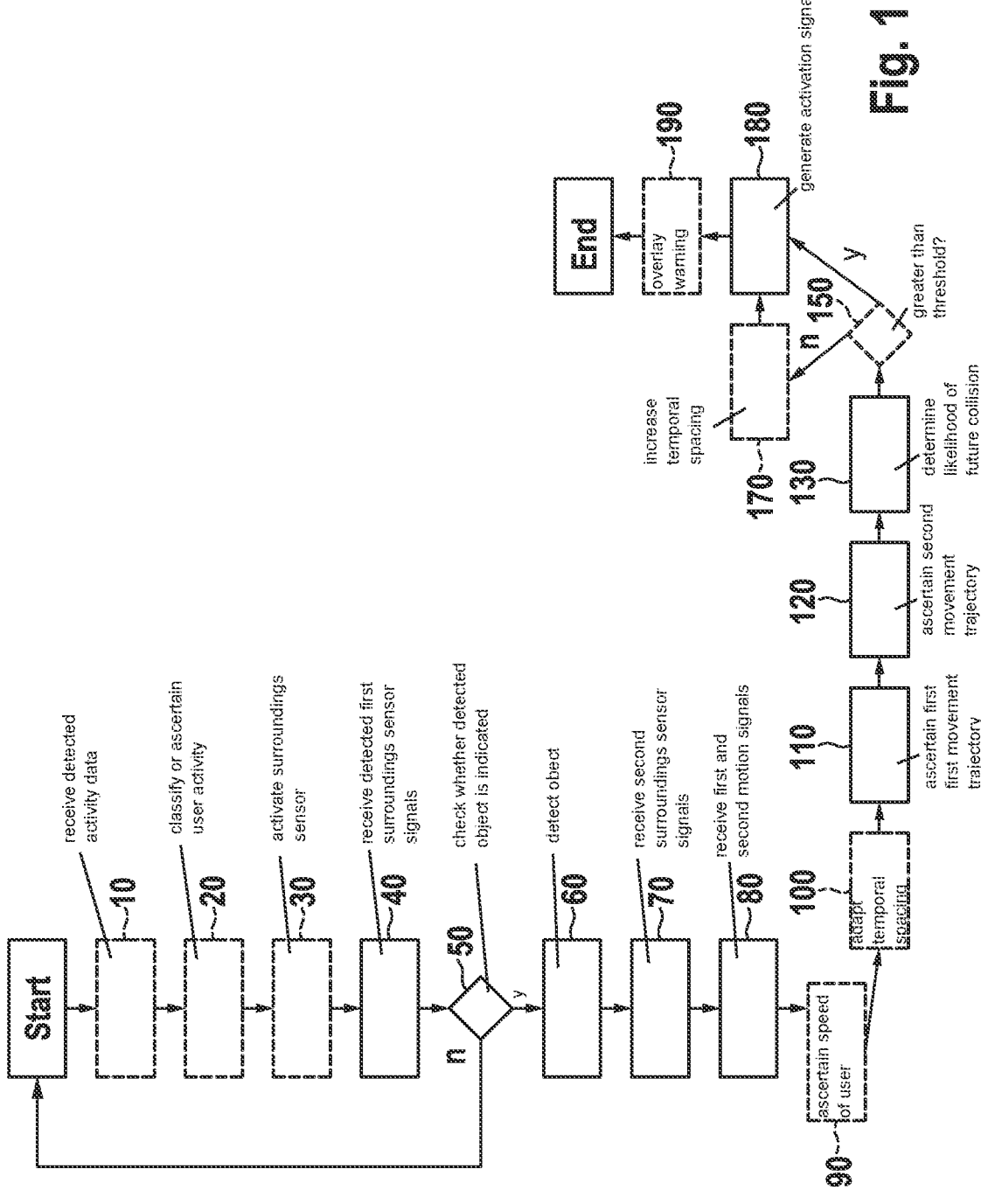
FIG. 1 shows a method for generating at least one activation signal for a warning display of a user of smart glasses, according to an example embodiment of the present invention.

FIG. 1 shows a method for generating at least one activation signal for a warning display of a user of smart glasses, in the form of a flowchart. Detected first surroundings sensor signals from the rear and/or lateral surroundings of the user of the smart glasses are received in a method step 40 at a first point in time with the aid of at least one surroundings sensor that is situated at at least one temple of the smart glasses, using a processing unit. It is subsequently checked in method step 50 whether or not the received first surroundings sensor signals indicate a detected object. If no object can be detected, the method is started from the beginning. If the detected first surroundings sensor signals indicate a detected object, at least one object in the rear and/or lateral surroundings of the user of the smart glasses is detected in method step 60 with the aid of the processing unit. Second surroundings sensor signals from the rear and/or lateral surroundings of the user of the smart glasses are subsequently received at a second point in time following the first point in time with the aid of the at least one surroundings sensor in method step 70, using the processing unit. The first and second surroundings sensor signals are in particular distance signals and/or speed signals. In addition, first and second motion signals of the user of the smart glasses, detected at two different points in time, in particular at the first point in time and at the second point in time, with the aid of the processing unit, are received in subsequent method step 80. The first and second motion signals of the user of the smart glasses are in particular speed signals and/or acceleration signals. A first movement trajectory of the detected object is ascertained as a function of the received first and second surroundings sensor signals, with the aid of the processing unit, in a method step 110 following method step 80. A second movement trajectory of the user of the smart glasses is ascertained as a function of the received first and second motion signals of the user of the smart glasses, with the aid of the processing unit, in a method step 120 following the method step 110. A likelihood of an in particular future collision of the user of the smart glasses with the detected object is ascertained as a function of the ascertained first and second movement trajectories in a subsequent method step 130 with the aid of the processing unit. At least one activation signal for the warning display of the user of the smart glasses is generated in a subsequent method step 180 with the aid of the processing unit.

Detected activity data of the user are received in an optional method step 10 at a third point in time, in particular with the aid of at least one eye tracker and/or acceleration sensor of the smart glasses, using the processing unit. The third point in time is temporally before the first point in time. A user activity of the user is subsequently classified or ascertained as a function of the received activity data in a method step 20 with the aid of the processing unit. At least one surroundings sensor of a plurality of surroundings sensors for detecting the first and second surroundings sensor signals is activated or deactivated in a subsequent method step 30 with the aid of the processing unit.

A speed of the user relative to the surroundings of the user is ascertained in an optional method step 90 as a function of the received first and second motion signals of the user of the smart glasses, with the aid of the processing unit. An in particular temporal spacing of the points in time for detecting the surroundings sensor signals from the rear and/or lateral surroundings of the user of the smart glasses, detected with the aid of the surroundings sensors, is subsequently adapted in method step 100 as a function of the ascertained speed of the user.

It is checked in an optional method step 150 whether the ascertained likelihood of a collision exceeds a certain threshold value. In particular, the threshold value is exceeded if the first and second movement trajectories meet, in particular intersect, in particular at the same time. If the threshold value is exceeded, the method continues unchanged with method step 180. If the threshold value is not exceeded, the in particular temporal spacing of the points in time for detecting the surroundings sensor signals from the rear and/or lateral surroundings of the user of the smart glasses, detected with the aid of the surroundings sensors, is increased (step 170).

The warning display is overlaid on the user's visual field in an optional method step 190 following method step 180.

Figure 2:
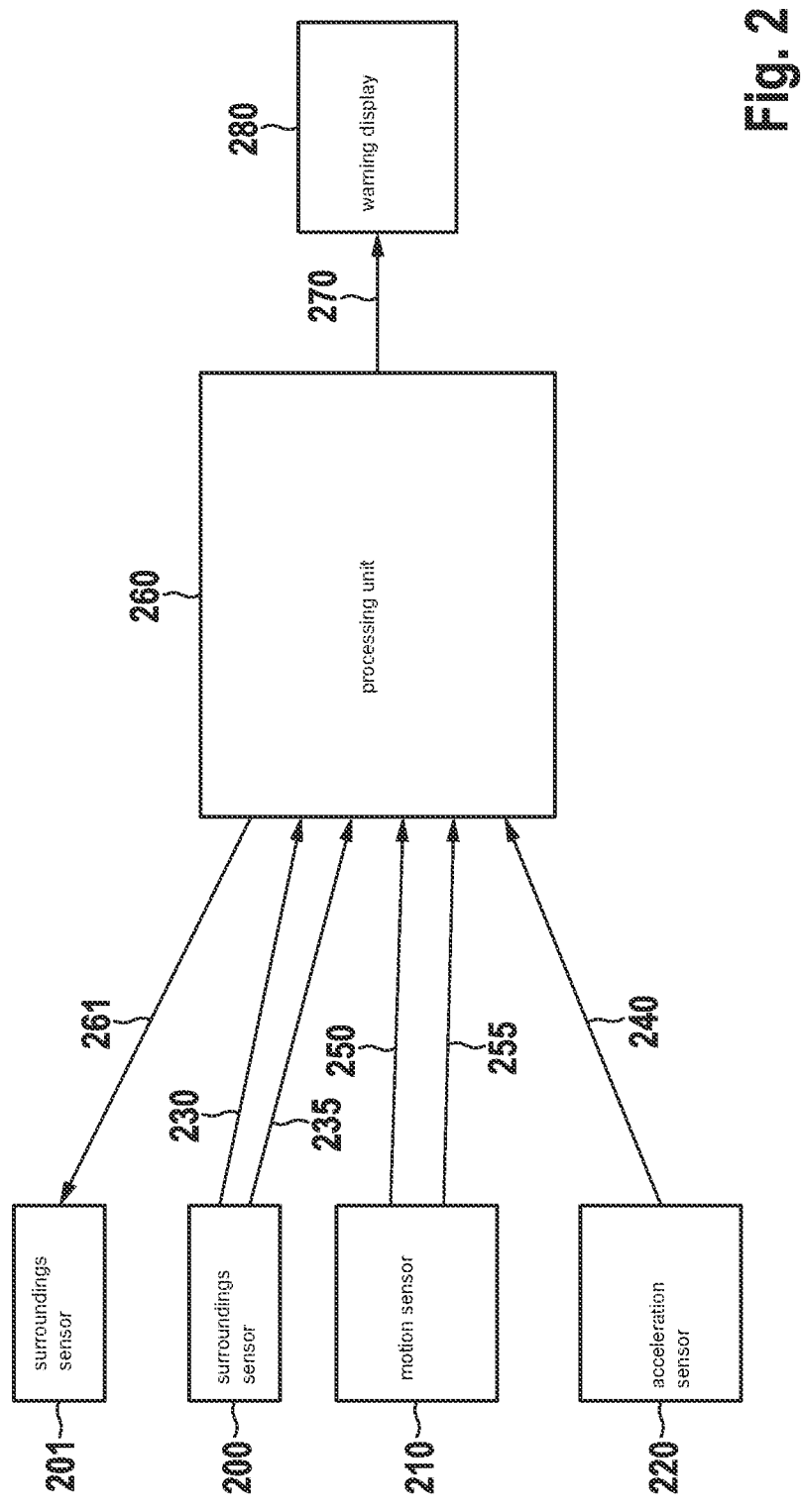
FIG. 2 shows a processing unit for carrying out the method, according to an example embodiment of the present invention.

FIG. 2 schematically shows a processing unit 260 that is designed to carry out the method illustrated in FIG. 1. Processing unit 260 is designed to receive first surroundings sensor signals 230 from the rear and/or lateral surroundings of the user of the smart glasses, detected at a first point in time with the aid of at least one surroundings sensor 200 situated at at least one temple of the smart glasses. In addition, processing unit 260 is designed to detect at least one object in the rear and/or lateral surroundings of the user of the smart glasses as a function of the received first surroundings sensor signals. Furthermore, processing unit 260 is designed to receive, at a second point in time following the first point in time, second surroundings sensor signals 235 from the rear and/or lateral surroundings of the user of the smart glasses, detected with the aid of the at least one surroundings sensor 200, as a function of the detected object. Moreover, processing unit 260 is used to receive first motion signals 250 and second motion signals 255 of the user of the smart glasses detected at two different points in time, in particular at the first point in time and at the second point in time, with the aid of a motion sensor 210. Processing unit 260 is designed to ascertain a first movement trajectory of the detected object as a function of received first surroundings sensor signals 230 and second surroundings sensor signals 235. Furthermore, processing unit 260 is used to ascertain a second movement trajectory of the user of the smart glasses as a function of received first motion signals 250 and second motion signals 255 of the user of the smart glasses. Moreover, processing unit 260 is used to ascertain a likelihood of an in particular future collision of the user of the smart glasses with the detected object as a function of the ascertained first and second movement trajectories, and to generate at least one activation signal 270 for a warning display 280 of the user of the smart glasses as a function of the ascertained likelihood of a collision.

Processing unit 260 is optionally used to receive activity data 240 of the user, detected at a third point in time with the aid of at least one acceleration sensor 220 of the smart glasses. The third point in time is temporally before the first point in time. In this regard, processing unit 260 is designed to classify a user activity of the user as a function of received activity data 240. In this exemplary embodiment, processing unit 260 is designed to deactivate, with the aid of a further activation signal 261, a surroundings sensor 201 of a plurality of surroundings sensors 200 and 201 for detecting first and second surroundings sensor signals 230 and 235.

Figure 3:
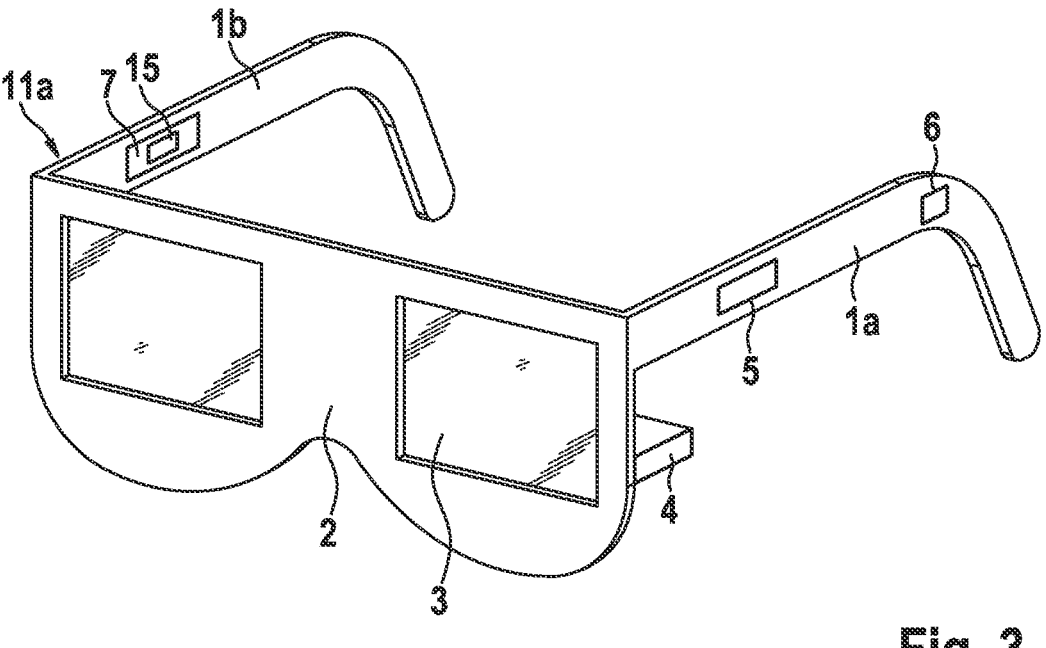
FIG. 3 shows a first exemplary embodiment of smart glasses, according to the present invention.

FIG. 3 shows a three-dimensional view of a first specific embodiment of smart glasses 11a. These smart glasses include a processing unit 15 as shown by way of example in FIG. 2. In addition, smart glasses 11a include a surroundings sensor 5 that is situated at a temple 1a of smart glasses 11a. This surroundings sensor 5 is designed to detect first and second surroundings sensor signals from the rear and/or lateral surroundings of the user of smart glasses 11a. In addition, the smart glasses include a warning display device. In this exemplary embodiment, this warning display device is designed as a retinal scan display of smart glasses 11a. For this purpose, smart glasses 11a include a projection unit 7 that is integrated into temple 1b and that is designed to project a warning display onto an eyeglass lens 3 of the smart glasses that is integrated into the frame 2 of the smart glasses. Eyeglass lens 3 includes a holographic optical element, not illustrated here, that diverts the projected image further into the retina of the user of the smart glasses. In this exemplary embodiment, processing unit 15 is integrated into projection unit 7 of smart glasses 11a.

In addition, in this exemplary embodiment, smart glasses 11a include a motion sensor 6 that is situated at smart glasses 11a. Motion sensor 6, which is likewise integrated into temple 1a of smart glasses 11a, is designed to detect first and second motion signals of the user of smart glasses 11a.

In this first exemplary embodiment, surroundings sensor 5 is a radar sensor, and motion sensor 6 is an acceleration sensor. In this exemplary embodiment, the acceleration sensor, as a motion sensor 6, may also be used to detect activity data of the user.

Smart glasses 11a additionally include an eye tracking sensor 4 for detecting activity data of the user.

Figure 4:
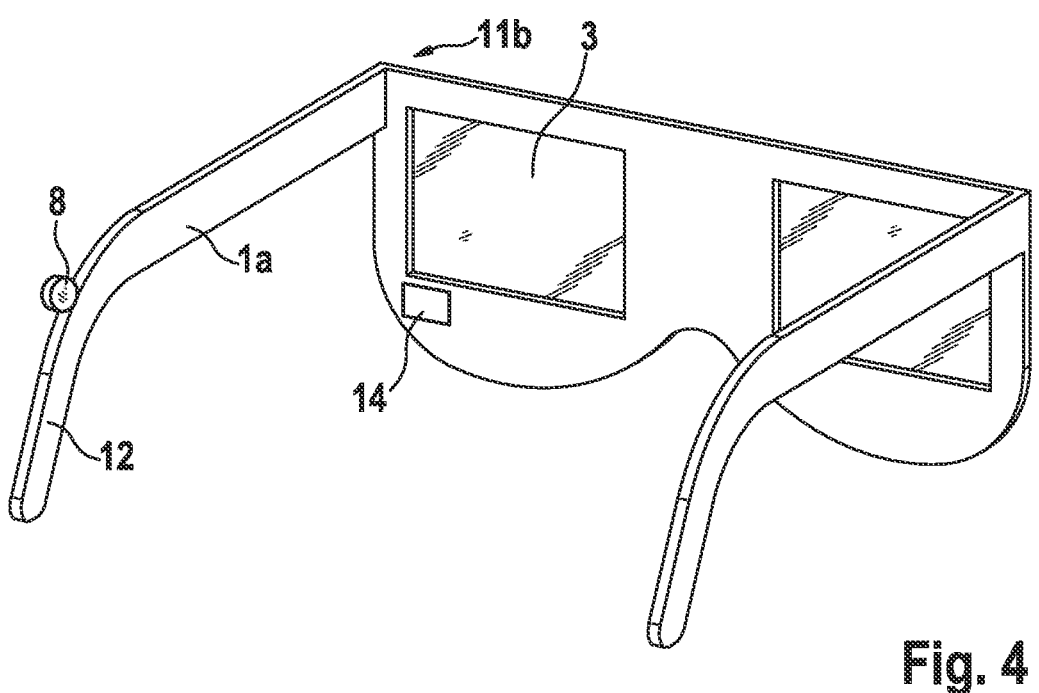
FIG. 4 shows a second exemplary embodiment of smart glasses, according to the present invention.

FIG. 4 shows a three-dimensional view of a portion of a second exemplary embodiment of smart glasses 11b. In contrast to the first exemplary embodiment, a surroundings sensor 8 for detecting the rear and/or lateral surroundings of the user of smart glasses 11b is situated facing the rear direction at a curvature 12 of temple 1a. Surroundings sensor 8 is thus better protected from being covered by hair of the user of smart glasses 11b. Surroundings sensor 8 is designed as an ultrasonic sensor.

In addition, in this second exemplary embodiment, warning display 14 is designed as an LED in the visual field of the user. The LED is situated on a lower corner of eyeglass lens 3.

Figure 5:
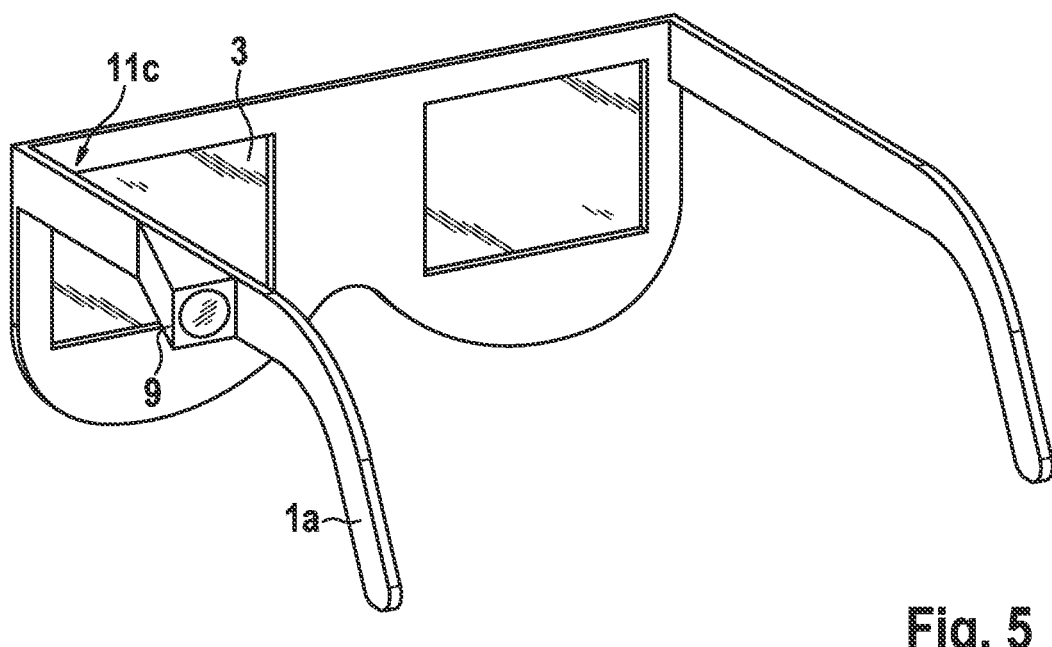
FIG. 5 shows a third exemplary embodiment of smart glasses, according to the present invention.

FIG. 5 shows a three-dimensional view of a portion of a third exemplary embodiment of smart glasses 11c. In contrast to the preceding exemplary embodiments, surroundings sensor 9 for detecting the rear and/or lateral surroundings of the user of the smart glasses is laterally situated on the outside of temple 1a. The surroundings sensor is designed as a LIDAR sensor. In this position as well, the surroundings sensor is less strongly affected by detection limitations due to hair or clothing of the user of the smart glasses.

Figure 6:
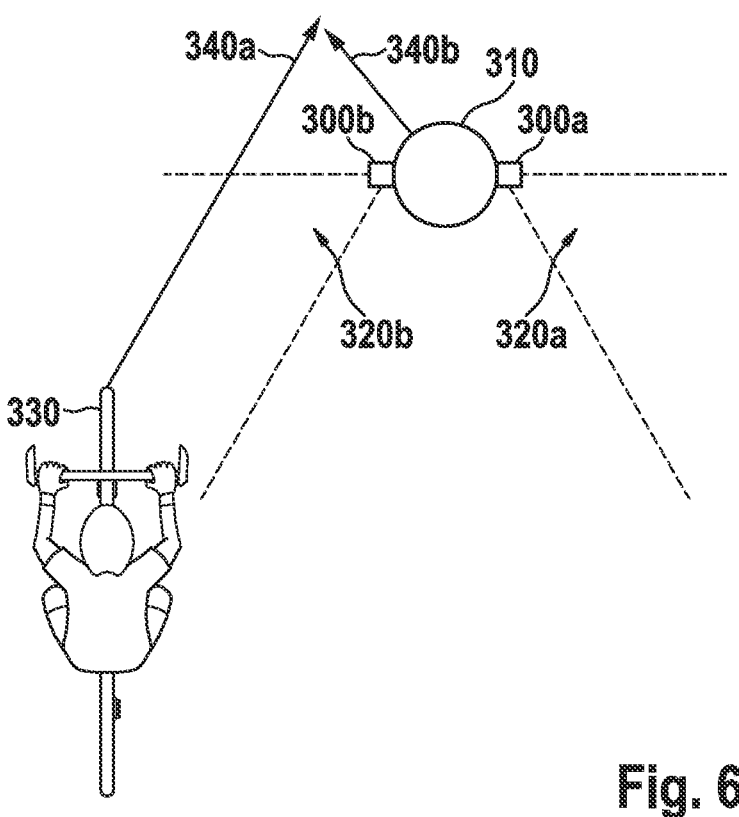
FIG. 6 shows an example of a situation including a smart glasses user, and a bicycle rider as the detected object.

FIG. 6 shows a top view of an example of a situation in which the above-mentioned warning display of a smart glasses user 310 is used. In this example case, smart glasses user 310 is presently jogging. A surroundings sensor 300b laterally situated at the smart glasses, not illustrated here, is designed as an ultrasonic sensor with a detection range 320b. A further surroundings sensor 300a at the smart glasses, not illustrated here, is likewise designed as an ultrasonic sensor with a detection range 320a. A bicycle rider 330 is situated to the side of and behind smart glasses user 310, and is traveling into detection range 320b of surroundings sensor 300b. The processing unit, not illustrated here, now ascertains first movement trajectory 340a of bicycle rider 330 and compares it to an ascertained second movement trajectory 340b of smart glasses user 310. It is thus established that the two movement trajectories 340a and 340b in the future will intersect essentially at the same time. This results in an increased likelihood of a collision, so that in this case the processing unit generates an activation signal for the warning display of the user of the smart glasses.

What is claimed is:

1. A method for generating at least one activation signal for a warning display of a user of smart glasses, the method comprising the following steps:
   receiving first surroundings sensor signals from rear and/or lateral surroundings of the user of the smart glasses, detected at a first point in time using at least one surroundings sensor situated at at least one temple of the smart glasses, using a processing unit;
   detecting at least one object in the rear and/or lateral surroundings of the user of the smart glasses as a function of the received first surroundings sensor signals, using the processing unit;
   receiving second surroundings sensor signals from the rear and/or lateral surroundings of the user of the smart glasses, detected at a second point in time following the first point in time using the at least one surroundings sensor as a function of the detected object, using the processing unit;
   receiving first motion signals and second motion signals of the user of the smart glasses detected at the first point in time and at the second point in time, respective, using the processing unit;
   ascertaining a first movement trajectory of the detected object as a function of the received first surroundings sensor signals and second surroundings sensor signals, using the processing unit;
   ascertaining a second movement trajectory of the user of the smart glasses as a function of the received first motion signals and the second motion signals of the user of the smart glasses, using the processing unit;
   ascertaining a likelihood of a future collision of the user of the smart glasses with the detected object as a function of the ascertained first movement trajectory and second movement trajectory, using the processing unit; and
   generating the at least one activation signal for the warning display of the user of the smart glasses when the ascertained likelihood of the future collision exceeds a predetermined threshold using the processing unit.

2. The method as recited in claim 1, wherein the first surroundings sensor signals and the second surroundings sensor signals represent distance signals of the user relative to the detected object, and/or speed signals.

3. The method as recited in claim 1, wherein the first motion signals and the second motion signals of the user of the smart glasses represent speed signals and/or acceleration signals.

4. The method as recited in claim 1, further comprising the following steps:
   receiving, using the processing unit, activity data of the user detected at a third point in time using at least one eye tracker and/or acceleration sensor of the smart glasses, the third point in time being temporally prior to the first point in time;
   classifying a user activity of the user as a function of the received activity data, using the processing unit;
   activating or deactivating at least one surroundings sensor of a plurality of surroundings sensors configured to detect the first surroundings sensor signals and the second surroundings sensor signals, using the processing unit.

5. The method as recited in claim 1, wherein the method further comprises the following steps:

ascertaining a speed of the user relative to surroundings of the user as a function of the received first motion signals and the second motion signals of the user of the smart glasses, using the processing unit; and adapting, using the processing unit, a temporal spacing of points in time for detecting surroundings sensor signals from the rear and/or lateral surroundings of the user of the smart glasses, detected using the surroundings sensors as a function of the ascertained speed of the user.

6. The method as recited in claim 5, wherein the temporal spacing of the points in time for detecting the surroundings sensor signals from the rear and/or lateral surroundings of the user of the smart glasses, detected using the surroundings sensors, is increased, using the processing unit, when the ascertained likelihood of the collision of the user of the smart glasses with the detected object is below a certain threshold value.

7. The method as recited in claim 1, wherein the activation signal for the warning display of the user of the smart glasses is generated when the first movement trajectory and second movement trajectory intersect at the same time.

8. The method as recited in claim 1, wherein the warning display is overlaid on a visual field of the user.

9. A processing unit configured to generate at least one activation signal for a warning display of a user of smart glasses, the processor unit configured to:

receive first surroundings sensor signals from rear and/or lateral surroundings of the user of the smart glasses, detected at a first point in time using at least one surroundings sensor situated at at least one temple of the smart glasses;

detect at least one object in the rear and/or lateral surroundings of the user of the smart glasses as a function of the received first surroundings sensor signals;

receive second surroundings sensor signals from the rear and/or lateral surroundings of the user of the smart glasses, detected at a second point in time following the first point in time using the at least one surroundings sensor, as a function of the detected object; and receive first motion signals and second motion signals of the user of the smart glasses, detected at the first point in time and at the second point in time, respectively;

ascertain a first movement trajectory of the detected object as a function of the received first surroundings sensor signals and the second surroundings sensor signals;

ascertain a second movement trajectory of the user of the smart glasses as a function of the received first motion signals and the second motion signals of the user of the smart glasses;

ascertain a likelihood of a future collision of the user of the smart glasses with the detected object as a function of the ascertained first movement trajectory and the second movement trajectory; and generate the at least one activation signal for the warning display of the user of the smart glasses when the ascertained likelihood of the future collision exceeds a predetermined threshold.

10

10. Smart glasses, comprising:

a processing unit;

a surroundings sensor situated at at least one temple of the smart glasses, the surroundings sensor configured to detect first surroundings sensor signals and second surroundings sensor signals from rear and/or lateral surroundings of a user of the smart glasses; and a warning display device;

wherein the processor is configured to:

receive the first surroundings sensor signals from the rear and/or lateral surroundings of the user of the smart glasses, detected at a first point in time using the surroundings sensor;

detect at least one object in the rear and/or lateral surroundings of the user of the smart glasses as a function of the received first surroundings sensor signals;

receive the second surroundings sensor signals from the rear and/or lateral surroundings of the user of the smart glasses, detected at a second point in time following the first point in time using the surroundings sensor, as a function of the detected object; and receive first motion signals and second motion signals of the user of the smart glasses, detected at the first point in time and at the second point in time, respectively;

ascertain a first movement trajectory of the detected object as a function of the received first surroundings sensor signals and the second surroundings sensor signals;

ascertain a second movement trajectory of the user of the smart glasses as a function of the received first motion signals and the second motion signals of the user of the smart glasses;

ascertain a likelihood of a future collision of the user of the smart glasses with the detected object as a function of the ascertained first movement trajectory and the second movement trajectory; and generate the at least one activation signal for the warning display of the user of the smart glasses when the ascertained likelihood of the future collision exceeds a predetermined threshold.

11. The smart glasses as recited in claim 10, further comprising:

a motion sensor situated at the smart glasses, the motion sensor configured to detect the first motion signals and the second motion signals of the user of the smart glasses.

12. The smart glasses as recited in claim 10, wherein the surroundings sensor is a radar sensor and/or an ultrasonic sensor and/or a LIDAR sensor.

13. The smart glasses as recited in claim 10, wherein the surroundings sensor configured to detect the rear and/or lateral surroundings of the user of the smart glasses is laterally situated on an outside of the at least one temple and/or facing a rear direction at a temple curvature of the temple.

14. The smart glasses as recited in claim 10, further comprising:

at least one acceleration sensor and/or eye tracking sensor configured to detect activity data of the user.

15. The smart glasses as recited in claim 10, wherein the warning display device is a retinal scan display of the smart glasses.

* * * * *